United States Patent
Lu

(10) Patent No.: US 6,256,838 B1
(45) Date of Patent: Jul. 10, 2001

(54) PIVOTING ASSEMBLY FOR A NOTEBOOK COMPUTER

(76) Inventor: Sheng-Nan Lu, No. 174, Chunying St., Shulin Chen, Taipei Hsien (TW)

( * ) Notice: Subject to any disclaimer, the term of this patent is extended or adjusted under 35 U.S.C. 154(b) by 0 days.

(21) Appl. No.: 09/491,022

(22) Filed: Jan. 25, 2000

(51) Int. Cl.$^7$ .................................................. E05D 11/08
(52) U.S. Cl. ............................. 16/342; 16/337; 16/340; 16/273
(58) Field of Search ............................. 16/342, 341, 337, 16/386, 336, 262, 268, 340, 273, 274; 403/297, 300; 361/681, 682, 683

(56) References Cited

U.S. PATENT DOCUMENTS

| | | | | |
|---|---|---|---|---|
| 5,503,491 | * | 4/1996 | Lu | 16/342 |
| 5,632,066 | * | 5/1997 | Huong | 16/342 |
| 5,697,125 | * | 12/1997 | Gannon | 16/337 |
| 5,832,566 | * | 11/1998 | Quek et al. | 16/342 |
| 5,894,635 | * | 4/1999 | Lu | 16/342 |
| 5,896,622 | * | 4/1999 | Lu | 16/342 |
| 5,943,738 | * | 8/1999 | Karfiol | 16/342 |
| 6,154,925 | * | 12/2000 | Miura | 16/338 |

* cited by examiner

Primary Examiner—Churck Y. Mah
(74) Attorney, Agent, or Firm—Thorp Reed & Armstrong

(57) ABSTRACT

A pivoting assembly for a notebook computer is disclosed. The pivoting assembly has a sleeve with a hole defined on one end, a pivoting axle extending into the hole, a positioning rod co-axially protruding from one end of the pivoting axle and received in the hole, multiple disk springs each having a central hole through which the positioning rod extends, at least one oil recess defined on the inner periphery of the central hole for lubricating oil in each oil recess, a limiting means to keep the pivoting axle from pulling away from the hole and a fixed means for keeping the disk springs from pivoting with the pivoting axle such that a pivoting assembly with a lubricating effect is achieved.

11 Claims, 5 Drawing Sheets

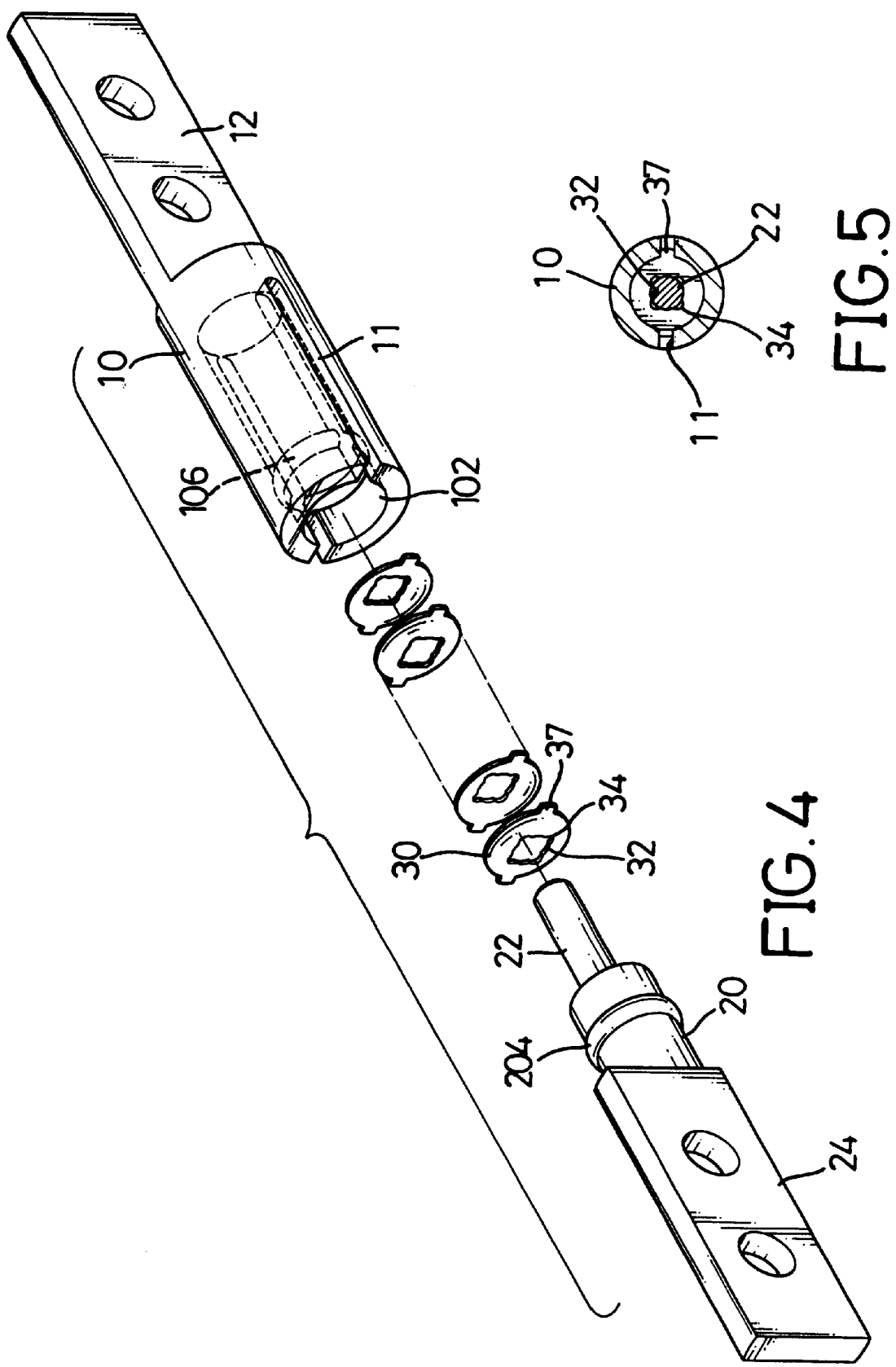

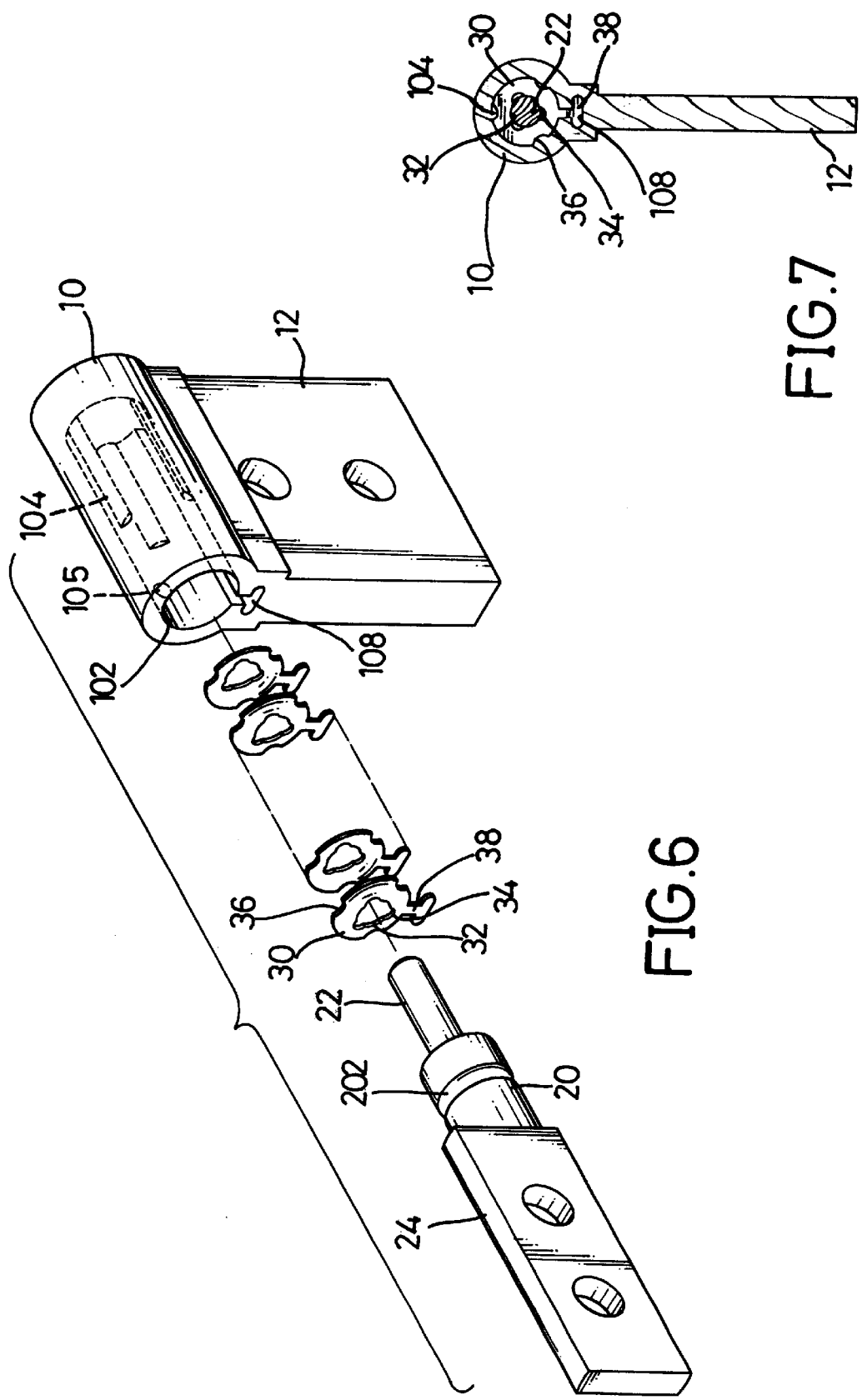

PIVOTING ASSEMBLY FOR A NOTEBOOK COMPUTER

BACKGROUND OF THE INVENTION

1. Field of the Invention

The present invention relates to a pivoting assembly, and more particularly to a pivoting assembly with good lubrication for a notebook computer.

2. Description of Related Art

Notebook computer are becoming extremely popular tools in many fields because of their compact nature. A pivoting assembly is arranged between the control unit and display unit of the notebook computer, such that the display unit is attached to the body of the computer, can be pivotally rotated relative to the body and be positioned at any desired angle. The conventional pivoting assembly substantially comprises a base, a pivoting axle extending through the base and multiple disk springs having a central hole through which the pivoting axle extends. The base and the pivoting axle are connected to the body and display unit respectively, such that the display unit can be positioned at any desired angle relative to the body by the tension and friction of the disk springs.

However, the inner periphery of the central hole of the disk spring is easily worn out due to the friction with the pivoting axle. This will cause a gap between the central hole and the pivoting axle so as to reduce the positioning effect of the pivoting assembly. In addition, although lubricating oil can be added to the pivoting assembly to reduce wear, the lubricating oil easily dries out because the disk springs are outer structures.

To overcome the shortcomings, the present invention tends to provide an improved pivoting assembly to mitigate or obviate the aforementioned problems.

SUMMARY OF THE INVENTION

The main objective of the invention is to provide an improved pivoting assembly having a sleeve, a pivoting axle extending into the sleeve, multiple disk springs received in the sleeve a limiting means to keep the pivoting axle from pulling away from the sleeve, a fixed means for keeping the disk springs from pivoting with the pivoting axle and at least one oil recess defined on each disk spring for lubricant. This can provide lubrication to the pivoting assembly and keep the lubricating oil from drying out because the disk springs are received in the sleeve.

Other objectives, advantages and novel features of the invention will become more apparent from the following detailed description when taken in conjunction with the accompanying drawings.

BRIEF DESCRIPTION OF THE DRAWINGS

FIG. 4 is an exploded perspective view of a second embodiment of a pivoting assembly in accordance with the present invention;

FIG. 5 is an end plan view in partial section of the pivoting assembly in FIG. 4;

FIG. 6 is an exploded perspective view of a third embodiment of a pivoting assembly in accordance with the present invention;

FIG. 7 is an end plan view in partial section of the pivoting assembly in FIG. 7.

DETAILED DESCRIPTION OF PREFERRED EMBODIMENT

Figure 1:
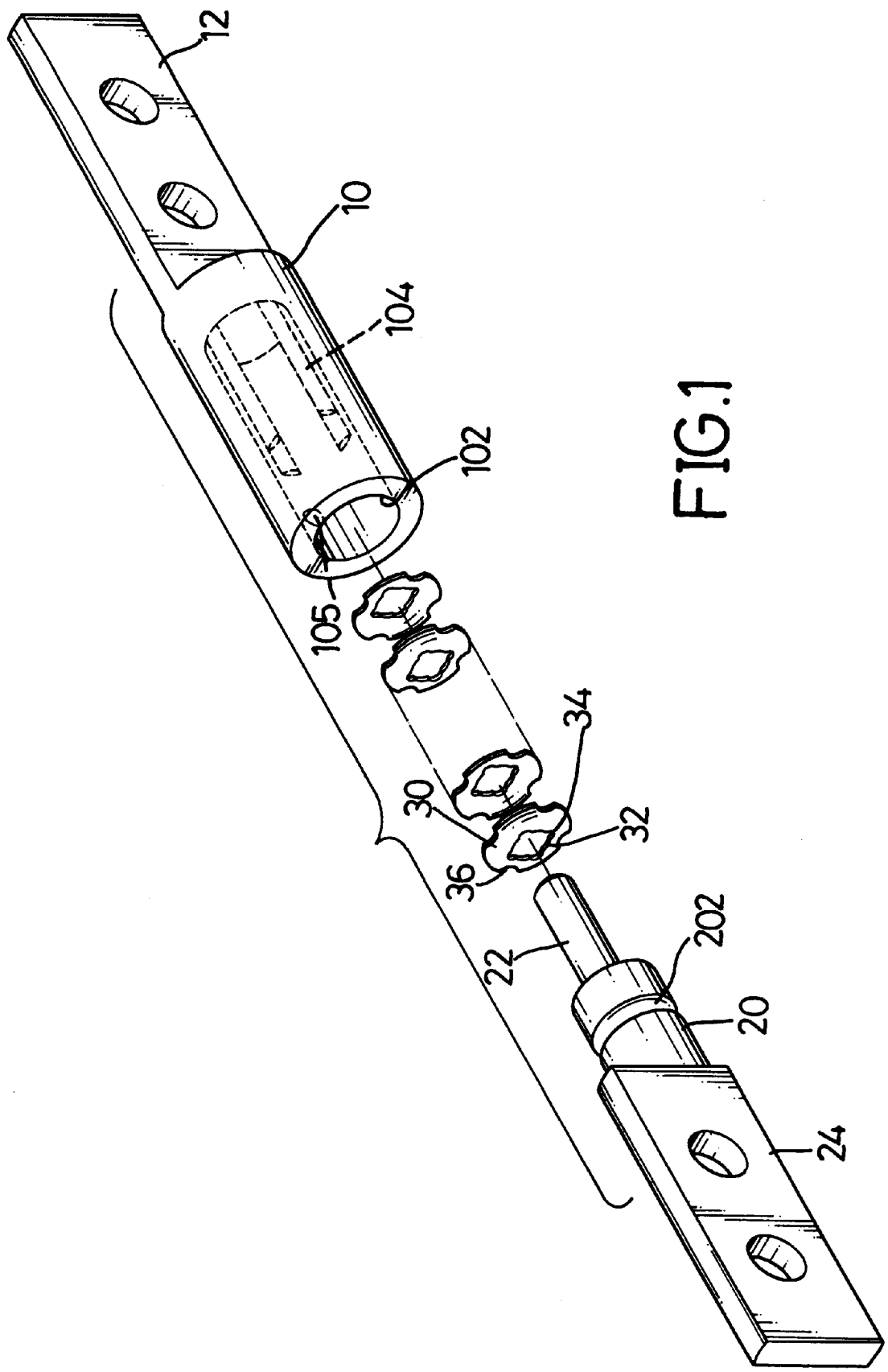
FIG. 1 an exploded perspective view of a first embodiment of a pivoting assembly in accordance with the present invention.
Figure 2:
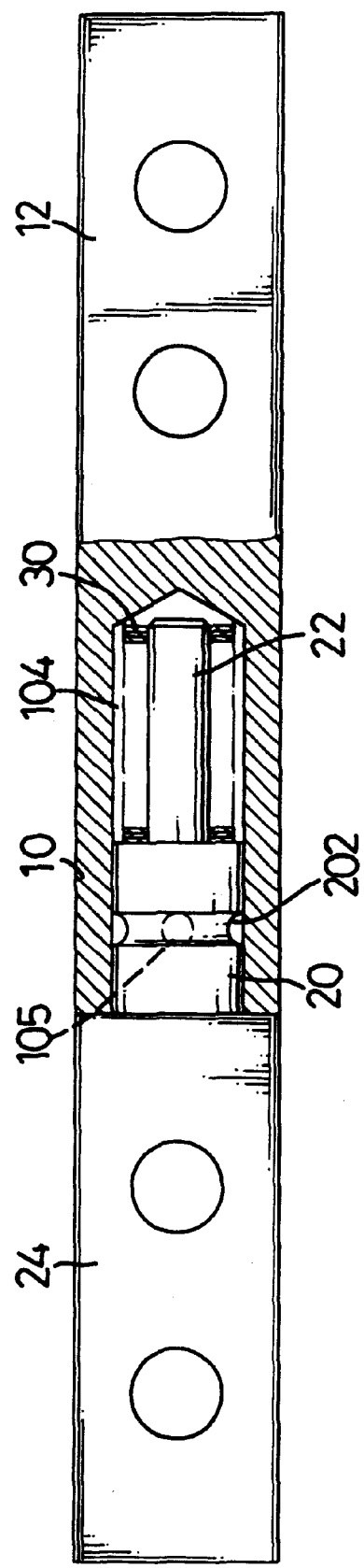
FIG. 2 is atop plan view in partial section of the pivoting assembly in FIG. 1.
Figure 3:
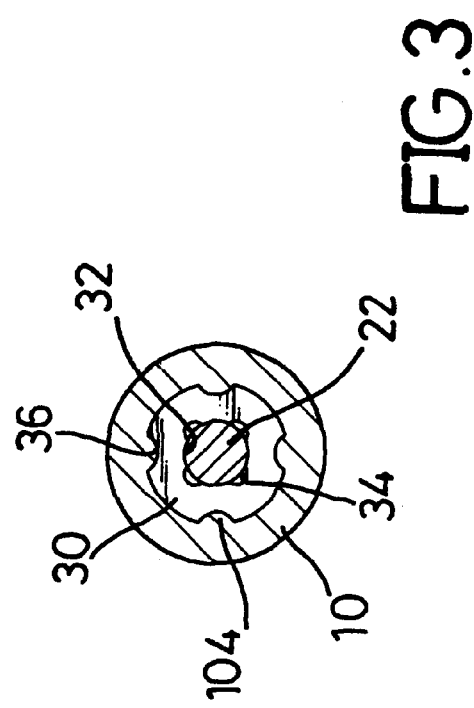
FIG. 3 an end plan view in partial section of the pivoting assembly in FIG. 1.

Referring to FIGS. 1–3, a pivoting assembly for a notebook computer in accordance with the present invention comprises a sleeve (10), a pivoting axle (20) and multiple disk springs (30). A hole (102) is defined in one end of the sleeve (10) into which the pivoting axle (20) extends. A connecting plate (12) is integrally formed on the end of the sleeve (10) to connect to either the body or the display unit of the notebook computer. The connecting plate (12) is either co-axial with the sleeve (10), as shown in FIGS. 1 and 2, or the connecting plate (12) extends downward from the outer periphery of the sleeve (10), as shown in FIGS. 6 and 7. With reference to FIGS. 1–3, a positioning rod (22) co-axially extends from one end of the pivoting axle (20) and is received in the hole (102) of the sleeve (10). A connecting plate (24) is integrally formed on the other end of the pivoting axle (20) to connect to the other unit of the notebook computer. The rod (22) has a diameter smaller than that of the pivoting axle (20).

A nub (105) protrudes from the inner face of the hole (102) of the sleeve (10). An annular groove (202) is defined around the outer periphery of the pivoting axle (20) to receive the nub (105). The engagement of the nub (105) and the groove (202) keep the pivoting axle (20) from pulling out of the hole (102) in the sleeve (10). In addition, when the pivoting axle (20) pivotally rotates relative to the sleeve (10), the nub (105) will slide in the groove (202) to keep the engagement between the nub (105) and the groove (202) from interfering with the movement of the pivoting axle (20).

Each disk spring (30) has a central hole (32) through which the positioning rod (22) extends. Thus, the notebook computer component connected to the pivoting axle (20) can be positioned at any desired angle relative to the another component connected to the sleeve (10). At least one oil recess (34) is defined in the inner periphery of the central hole (32) of the disk spring (30), such that a space is defined between the disk spring (30) and the positioning rod (22) for the lubricant. This can provide lubrication to the pivoting assembly so as to keep the central hole (32) from being worn out by friction. Furthermore, because all of the disk springs (30) are received in the sleeve (10) hole (102), the lubricating oil will not easily dry out, and the useful life the pivoting assembly is increased.

At least one rib (104) is axially formed on the inner face of the hole (102) of the sleeve (10). A positioning recess (36) is defined on the outer edge of each of the disk springs (30) to receive one of the ribs (104). When the pivoting axle (20) pivotally rotates relative to the sleeve (10), the engagement of the ribs (104) in the positioning recesses (36) will keep the disk springs (30) from rotating with the pivoting axle (20).

In the second embodiment as shown in FIGS. 4 and 5, a convex annular ring (204) protrudes from the outer periphery of the pivoting axle (20). An annular groove (106) is defined around the inner face of the hole (102) of the sleeve

(10) to receive the ring (204). Thus, an another means for limiting the lateral movement of the pivoting axle (20) in the sleeve (10) is achieved. At least one axial gap (11) is defined in the sleeve (10) and communicates with the hole (102). An key (37) radially protrudes from the outer periphery of each of disk springs (30) to be received in each gap (11) on the sleeve (10). By such an arrangement, the disk springs (30) will not rotate with the pivoting axle (20).

Figure 8:
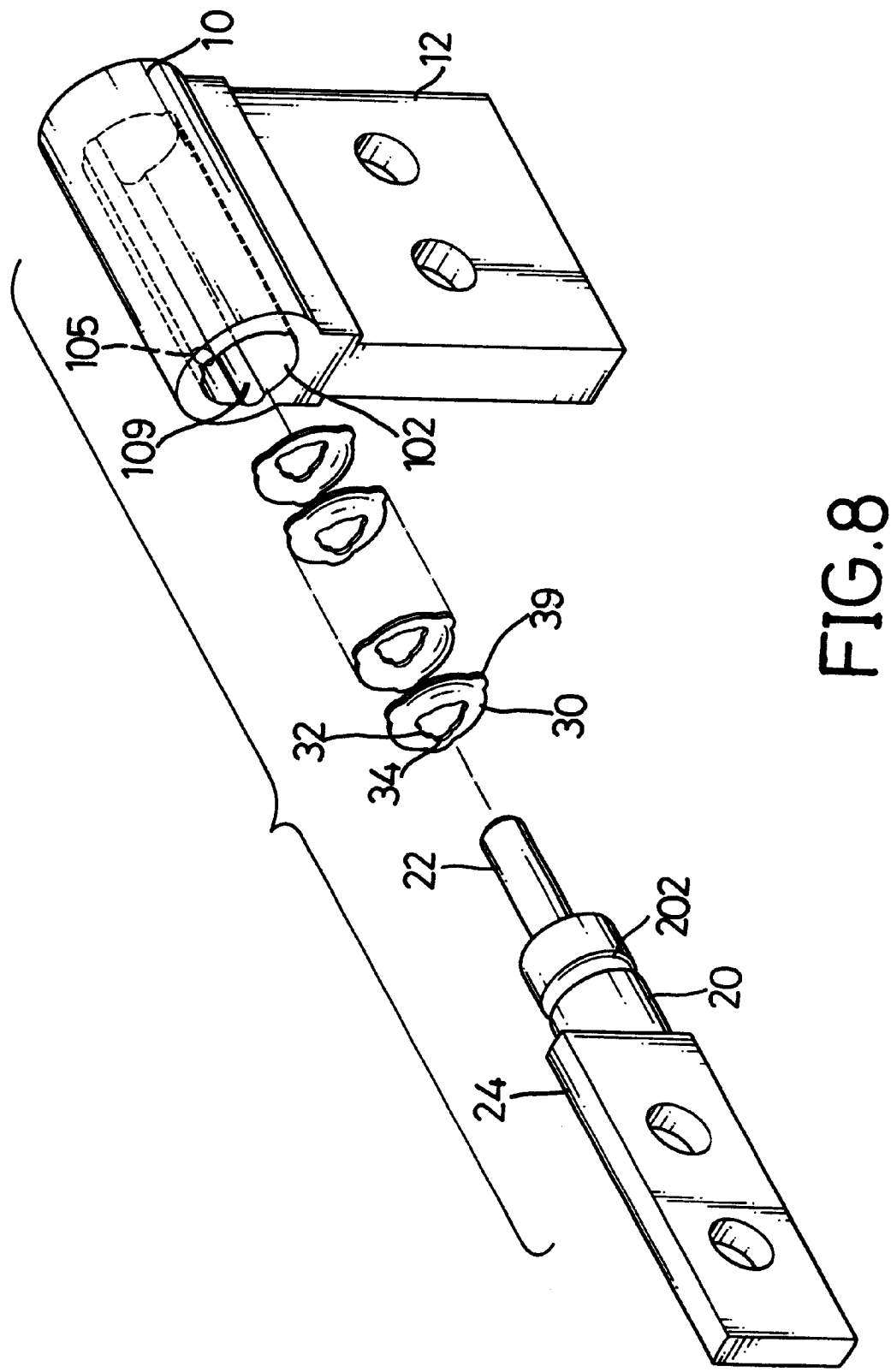
FIG. 8 is an exploded perspective view of a fourth embodiment of a pivoting assembly in accordance with the present invention.

In the third embodiment as shown in FIGS. 6 and 7, an axial inverse T-shaped keyway (108) is defined in the inner face of the hole (102) of the sleeve (10). A key (38) with a shape corresponding to the keyway (108) protrudes radially from the outer periphery of each of the disk springs (30) to be received in the keyway (108) in the sleeve (10). This also can keep the disk springs (30) from pivoting as the pivoting axle (20) rotates relative to the sleeve (10). In the fourth embodiment as shown in FIG. 8, at least one axial keyway (109) is defined in the inner face of the hole (102) in the sleeve (10). A key (39) radially protrudes from the outer periphery of each of the disk springs (30) to be received in each keyway (109) in the sleeve (10). Thus, a fourth means for keeping the disk springs (30) from pivoting with the pivoting axle (20) is achieved.

Even though numerous characteristics and advantages of the present invention have been set forth in the foregoing description, together with details of the structure and function of the invention, the disclosure is illustrative only, and changes may be made in detail, especially in matters of shape, size, and arrangement of parts within the principles of the invention to the full extent indicated by the broad general meaning of the terms in which the appended claims are expressed.

What is claimed is:

1. A pivoting assembly comprising:
    a sleeve with a hole defined on one end and having a connecting plate integrally formed on the other end;
    a pivoting axle extending into said hole of said sleeve;
    a positioning rod co-axially protruding from one end of said pivoting axle and received in said hole of said sleeve;
    a second connecting plate integrally formed on the other end of said pivoting axle;
    multiple disk springs each having a central hole through which said positioning rod extends;
    at least one oil recess defined on the inner periphery of said central hole for lubricating oil;
    a limiting means to keep said pivoting axle from pulling out of said hole of said sleeve; and
    a fixed means for keeping said disk springs from pivoting with said pivoting axle.

2. The pivoting assembly as claimed in claim 1, wherein said limiting means is a nub protruding from the inner face of said hole of said sleeve; and an annular groove is defined around the outer periphery of said pivoting axle to receive said nub.

3. The pivoting assembly as claimed in claim 1, wherein said limiting means is a convex annular ring protruding from the outer periphery of said pivoting axle; and
    an annular groove is defined around the inner face of said hole of sleeve to receive said convex annular ring.

4. The pivoting assembly as claimed in claim 1, wherein said fixed means is at least one axial rib protruding from the inner face of said hole of said sleeve; and
    a positioning recess is defined on the outer edge of each of said disk springs to receive one of said ribs of said sleeve.

5. The pivoting assembly as claimed in claim 1, wherein said fixed means is at least one axial gap defined on said sleeve and communicating with said hole; and
    a key radially protrudes from the outer edge of each of disk springs to be received in each gap on said sleeve.

6. The pivoting assembly as claimed in claim 1, wherein said fixed means is at least one axial keyway defined in the inner face of said hole of said sleeve; and
    a key radially protrudes from the outer edge of each of the disk springs to be received in each keyway in said sleeve.

7. The pivoting assembly as claimed in claim 1, wherein said fixed means is a axial noncircular keyway defined in the inner face of said hole of said sleeve; and a key having a corresponding shape with said keyway protrudes radially from the outer edge of each of the disk springs to be received in said keyway of said sleeve.

8. The pivoting assembly as claimed in claim 7, wherein said keyway and key of each disk spring are an inverse T-shape.

9. The pivoting assembly as claimed in claim 1, wherein said connecting plate on said sleeve is co-axial with said sleeve.

10. The pivoting assembly as claimed in claim 1, wherein said connecting plate on said sleeve extends downward from the outer periphery of said sleeve.

11. The pivoting assembly as claimed in claim 1, wherein said connecting plate on said pivoting axle is co-axial with said axle.

* * * * *